(12) United States Patent
Takayama et al.

(10) Patent No.: US 6,978,710 B2
(45) Date of Patent: Dec. 27, 2005

(54) PNEUMATIC BOOSTER

(75) Inventors: Toshio Takayama, Yamanashi-ken (JP); Mitsuhiro Endo, Minami Alps (JP); Shuzo Watanabe, Minami Alps (JP)

(73) Assignee: Kabushiki Kaisha Hitachi Seisakusho, Tokyo (JP)

( * ) Notice: Subject to any disclaimer, the term of this patent is extended or adjusted under 35 U.S.C. 154(b) by 0 days.

(21) Appl. No.: 10/900,688

(22) Filed: Jul. 28, 2004

(65) Prior Publication Data
US 2005/0061142 A1    Mar. 24, 2005

(30) Foreign Application Priority Data
Sep. 19, 2003   (JP)   ............................. 2003-328157

(51) Int. Cl.[7] ............................................. B60T 13/52
(52) U.S. Cl. ................................................ 91/369.2
(58) Field of Search ............................. 91/369.2, 369.3, 91/376 R

(56) References Cited

U.S. PATENT DOCUMENTS

| | | | |
|---|---|---|---|
| 6,711,982 B2 * | 3/2004 | Machida et al. | ............ 91/369.3 |
| 6,715,401 B2 * | 4/2004 | Takasaki et al. | ........... 91/369.2 |
| 6,843,161 B2 * | 1/2005 | Schluter | ..................... 91/369.2 |
| 2002/0129697 A1 | 9/2002 | Machida et al. | |

* cited by examiner

Primary Examiner—Thomas E. Lazo
(74) Attorney, Agent, or Firm—Brinks Hofer Gilson & Lione

(57) ABSTRACT

An elastic member is interposed between a reaction disk and a plunger. By moving the plunger to open a poppet seal such that atmospheric air is introduced into the variable pressure chambers, a pressure differential is created between the variable pressure chambers and constant pressure chambers (negative pressure). As a result, servo power is applied to an output rod, and a resulting reaction force is partly transmitted back to an input rod through the reaction disk. During a rapid braking operation, a piston is caused to retract by a pin, thus pushing the elastic member into an outer peripheral groove formed on the piston so that the elastic member is axially compressed. As a result, the movement amount of the plunger can be increased without receiving a reaction force, enabling the rapid development of servo power.

2 Claims, 5 Drawing Sheets

PNEUMATIC BOOSTER

This application claims priority under 35 U.S.C. § 119 to Japanese Patent Application No. 2003-328157 filed Sep. 19, 2003, the entire content of which is hereby incorporated by reference.

BACKGROUND

1. Field of the Invention

The present invention relates to a pneumatic booster attached to a brake apparatus for a vehicle such as an automobile.

2. Description of the Related Art

Typically, a pneumatic booster is attached to a brake apparatus for an automobile so as to generate a large braking force. Known examples, of a pneumatic booster include a pneumatic booster in which a housing is divided, by means of a power piston, into a constant pressure chamber (which is maintained at negative pressure at all times by a negative intake pressure of an engine) and a variable pressure chamber. A valve body is connected to the power piston, and a plunger provided inside the valve body is moved by means of an input rod to introduce atmospheric air (positive pressure) into the variable pressure chamber, thus generating a pressure differential between the constant pressure chamber and the variable pressure chamber. A thrust force generated in the power piston by the pressure differential is applied to an output rod through a reaction member, and a reaction force of the output rod which acts oh the reaction member is partly transmitted back to the input rod.

In a pneumatic booster of this type, the relationship between an input force (an operating force acting on a brake pedal) and an output force (a braking force) is as indicated by the solid line in FIG. 8. As shown in FIG. 8, in an initial stage of a braking operation, a "jump-in" output A is generated due to the existence of a gap between the plunger and the reaction member. Thereafter, the output force increases linearly in proportion to the input force to reach a full-load point B.

Needless to say, in the conventional pneumatic booster described above, since the braking force and brake pedal operating force are linearly commensurate, a large operating force is required to generate a large braking force in an event of an emergency. Therefore, to reduce the brake pedal operating force when a large braking force is required in the event of an emergency, a pneumatic booster comprising a so-called brake assisting mechanism is desirable. A pneumatic booster comprising a brake assisting mechanism, in combination with an anti-lock brake apparatus which prevents wheel lock during braking, can be expected to remarkably improve the braking force in an event of an emergency.

A pneumatic booster comprising a brake assisting mechanism is disclosed in Japanese Unexamined Patent Application Publication No. 2000-25603, for example. In this type of pneumatic booster, a plunger is associated with the expansion and contraction of a spring so that when the brake pedal depression force exceeds a fixed value in an event of an emergency, the spring is compressed, and the plunger is displaced greatly relative to the valve body. Thus, a boosting ratio increases rapidly as indicated by a portion C in FIG. 8, enabling a large braking force to be generated.

SUMMARY OF THE INVENTION

The present invention has been designed in consideration of the above, and it is an object thereof to provide a pneumatic booster having a simple constitution, which is capable of rapidly developing an output force in the event of an emergency so that a desired braking force can be reliably generated.

To solve the problems described above, the present invention is a pneumatic booster in which a housing is divided into a constant pressure chamber and a variable pressure chamber by a power piston, and a plunger disposed inside a valve body which is connected to the power piston is moved by an input rod, thereby opening valve means to introduced a working gas into the variable pressure chamber, thus generating a pressure differential between the constant pressure chamber and the variable pressure chamber, whereby a thrust force generated in the power piston by the pressure differential is applied to an output rod through a reaction member, and a reaction force from the output rod which acts on the reaction member is partly transmitted to the input rod, wherein an annular elastic member is interposed between the reaction member and the plunger, and control means are provided to restrict radially inward deformation of the elastic member, thereby restricting compression of the elastic member in the movement direction of the plunger, under normal conditions, and to permit radially inward deformation of the elastic member, thereby permitting compression of the elastic member in the movement direction of the plunger, when a movement amount of the plunger in relation to the valve body reaches a predetermined value.

According to this constitution, when an input force is applied to the input rod at a high speed, the movement amount of the plunger increases relative to the valve body, whereby the control means permit radially inward deformation of the elastic member so that the elastic body is compressed in the movement direction of the plunger. As a result, the movement amount of the plunger can be increased without increasing the reaction force from the reaction member, and the degree of opening of the valve means can be increased, enabling an increase in the output force applied to the output rod. Hence during a rapid braking operation, a braking force can be developed rapidly while reducing the operating force.

DETAILED DESCRIPTION OF THE PREFERRED EMBODIMENTS

An embodiment of the present invention will be described in detail below with reference to the attached drawings.

Figure 1:
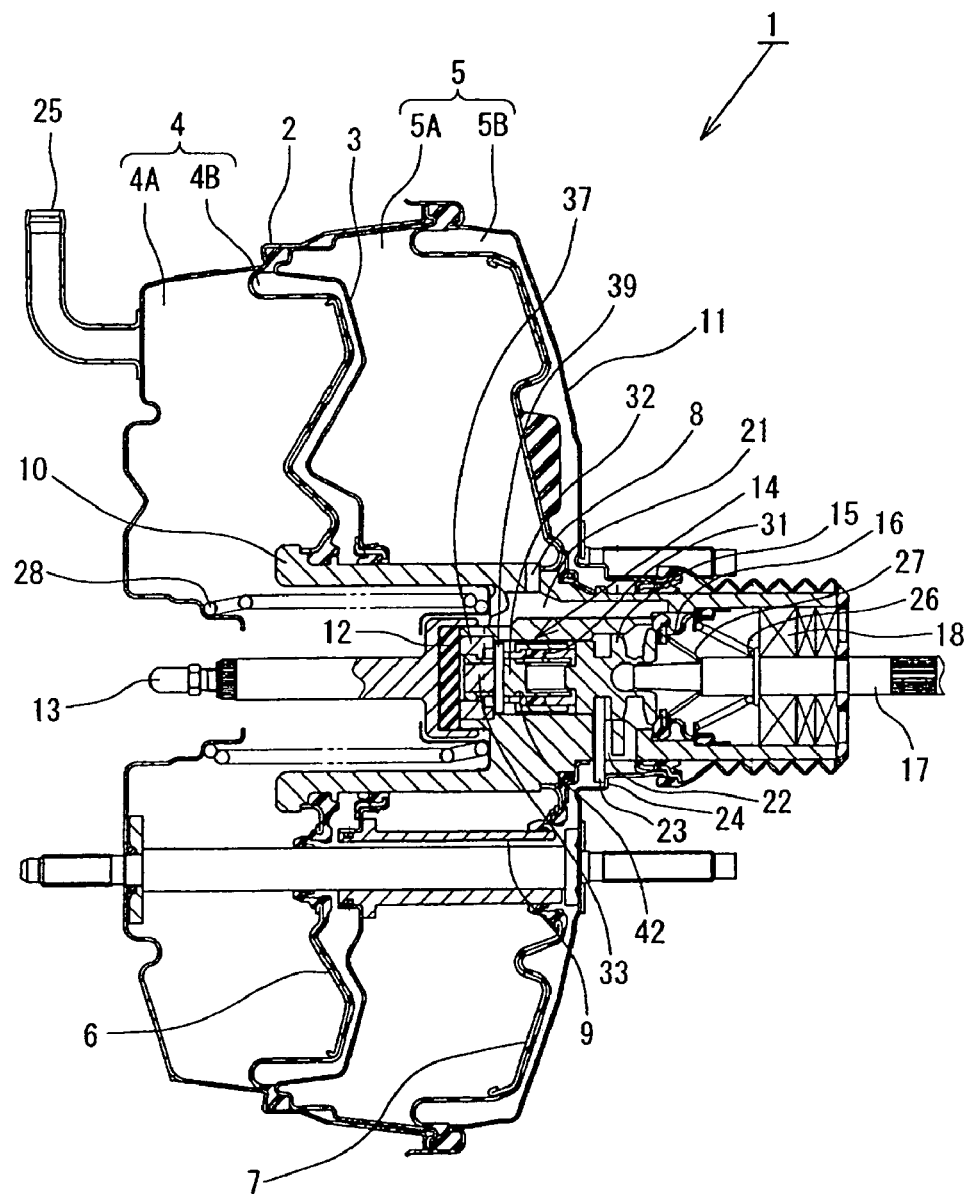
FIG. 1 is a longitudinal sectional view of a pneumatic booster according to an embodiment of the present invention.

As shown in FIG. 1, a pneumatic booster 1 according to this embodiment is a tandem type pneumatic booster in which the interior of a shell 2 (housing) is divided into two chambers, namely a front chamber 4 and a rear chamber 5, by a dividing wall 3. The front chamber 4 and rear chamber 5 are divided into constant pressure chambers 4A, 5A and variable pressure chambers 4B, 5B respectively by power pistons 6, 7. The constant pressure chambers 4A, 5A and the variable pressure chambers 4B, 5B respectively communicate with each other through passages 8, 9 respectively. A substantially cylindrical valve body 10 is connected to the power pistons. 6, 7, and the valve body 10 is slidably and air-tightly inserted through the dividing wall 3 and a rear wall 11 of the shell 2 such that a rear end portion of the valve body 10 extends from the rear wall 11 to the outside. An output rod 13 is connected to the front portion of the valve body 10 through a reaction disk 12 (a reaction member). A tip end portion of the output rod 13 is connected to a piston provided in a master cylinder (not shown) attached to a front wall of the shell 2.

A brake assisting mechanism 14, a plunger 15, a poppet seal 16 (valve means), and an input rod 17 are provided in the interior of the valve body 10. The brake assisting mechanism 14 is interposed between one end portion of the plunger 15 and the reaction disk 12, and one end portion of the input rod 17 is connected to the other end portion of the plunger 15. The other end portion of the input rod 17 is inserted through a gas-permeable dust seal 18 attached to the rear end portion of the valve body 10, and extends to the outside such that the tip end portion thereof is connected to a brake pedal (not shown). The poppet seal 16 is seated on a seat portion 19 of the valve body 10 and a seat portion 20 of the plunger 15. The poppet seal 16, as the plunger 15 moves, opens or closes communication between the passage 21 communicating with the constant pressure chambers 4A, 5A and the passage 22 communicating with the variable pressure chambers 4B, 5B, and communication between the passage 22 and the atmosphere.

A stop key 23 is inserted into the passage 22 of the valve body 10. The stop key 23, when coming in abutment with a stopper 24 of the shell 2, restricts retracting move of the valve body 10 and thus restricts relative move between the plunger 15 and the valve body 10. Note that in FIGS. 1 and 2, the reference numerals 25, 26, 27, and 28 respectively denote a negative pressure introduction port which communicates with a negative pressure source such as the intake pipe of the engine for introducing negative pressure into the constant pressure chamber 4A, a return spring for the input rod 17, a valve spring for urging the poppet seal 16, and a return spring for the valve body 10.

Next, the brake assisting mechanism 14, which is the main part of this embodiment, will be described with reference to FIGS. 2 and 3.

The brake assisting mechanism 14 comprises a reaction force member 29 abutting against the reaction disk 12, a holder 30 abutting against the plunger 15, an annular elastic member 31 interposed between the reaction force member 29 and holder 30, and a piston 32 fitted in the reaction force member 29, holder 30, and elastic member 31. The reaction force member 29 is comprised of a small diameter circular columnar portion 33 abutting against the reaction disk 12, and a large diameter cylindrical portion 34 abutting against the elastic member 31. A pin hole 35 is pierced through a front end portion wall of the cylindrical portion 34 in a diametrical direction. A cylindrical ratio ring 36 having a stepped portion 36A on its outer periphery is slidably fitted over the columnar portion 33. The stepped portion 36A engages with a stepped portion 38 of an annular pressure receiving member 37 mounted on the front end portion of the valve body 10 to thereby restrict retracting move of the ratio ring 36. A pin 39 is inserted in the pin hole 35 of the reaction force member 29 such that the two end portions of the pin 39 protruding from the cylindrical portion 34 are disposed in positions enabling contact with the rear end portion of the pressure receiving member 37. The pin 39 has a smaller diameter than the pin hole 35, and is therefore capable to move within the pin hole 35 in the axial direction of the reaction force member 29.

The holder 30 is comprised of a cylindrical member 40 made equal in diameter to the cylindrical portion 34 of the reaction force member 29, and a guide member 41 which is fixed to the outside of the cylindrical member 40. The holder 30 is connected to the reaction force member 29 by having the guide member 41 guide the cylindrical portion 34 of the reaction force member 29, which is slidably inserted into the guide member 41, such that an inside flange portion formed on the tip end portion of the guide member 41 engages with an outside flange portion formed on the rear end portion of the cylindrical portion 34. The elastic member 31 is made equal in diameter to the cylindrical portion 34 of the reaction force member 29 and the cylindrical member 40 of the holder 30, and the piston 32 (control means) is slidably fitted in the inner periphery of these components. An outer peripheral groove 42 is formed on the piston 32. The piston 32 is pushed against the pin 39 by means of a spring 43 provided between the piston 32 and the plunger 15.

Figure 2:
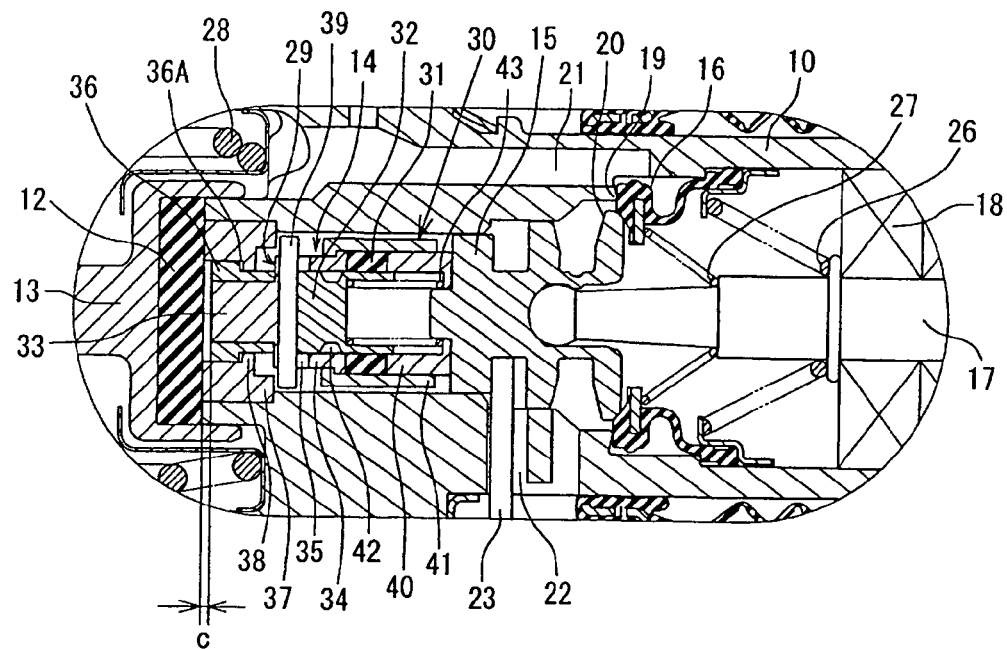
FIG. 2 is a view showing an enlargement of the main parts of the device in FIG. 1.
Figure 3:
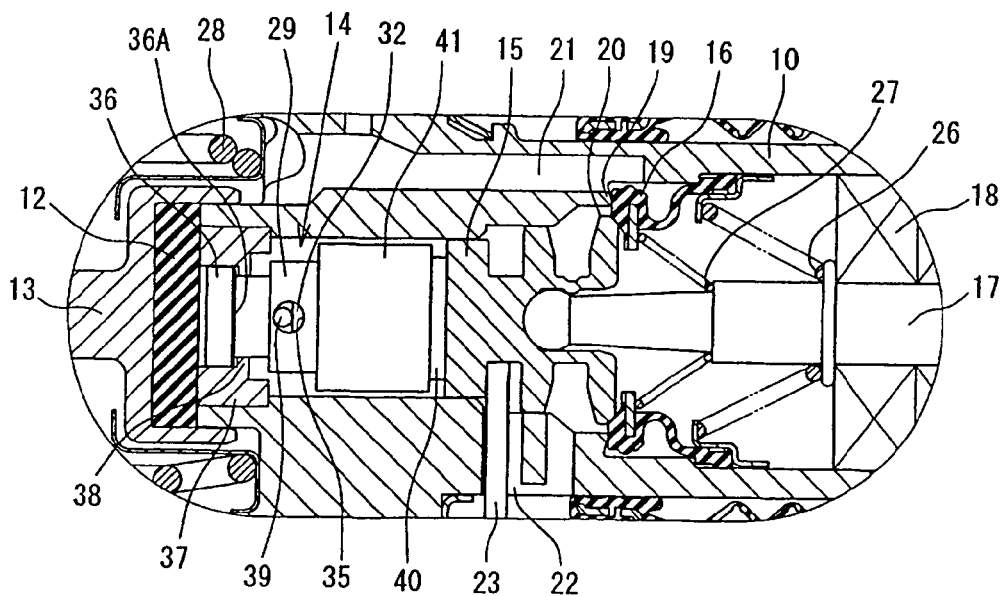
FIG. 3 is a transverse sectional view showing an enlargement of the main parts of the device in FIG. 1.

In a non-braking condition shown in FIG. 2, a predetermined jump-in clearance C is provided between the reaction disk 12 and the columnar portion 33 of the reaction force member 29, and a predetermined gap is also provided between the pin 39 and the rear end portion of the pressure receiving member 37. The outer peripheral groove 42 of the piston 32, which is pushed against the pin 39, is positioned facing the cylindrical portion 34 of the reaction force member 29.

The operations of this embodiment, constituted as described above, will now be described.

In the non-braking condition shown in FIG. 2, the poppet seal 16 is seated on the seat portions 19, 26, thus preventing the variable pressure chambers 4B, 5B from communicating with the atmosphere and the constant pressure chambers 4A, 5A (negative pressure). The pressure in the constant pressure chambers 4A, 5A and the pressure in the variable pressure chamber 4B, 5B are balanced, and hence no thrust force is generated in the power pistons 6, 7.

Figure 4:
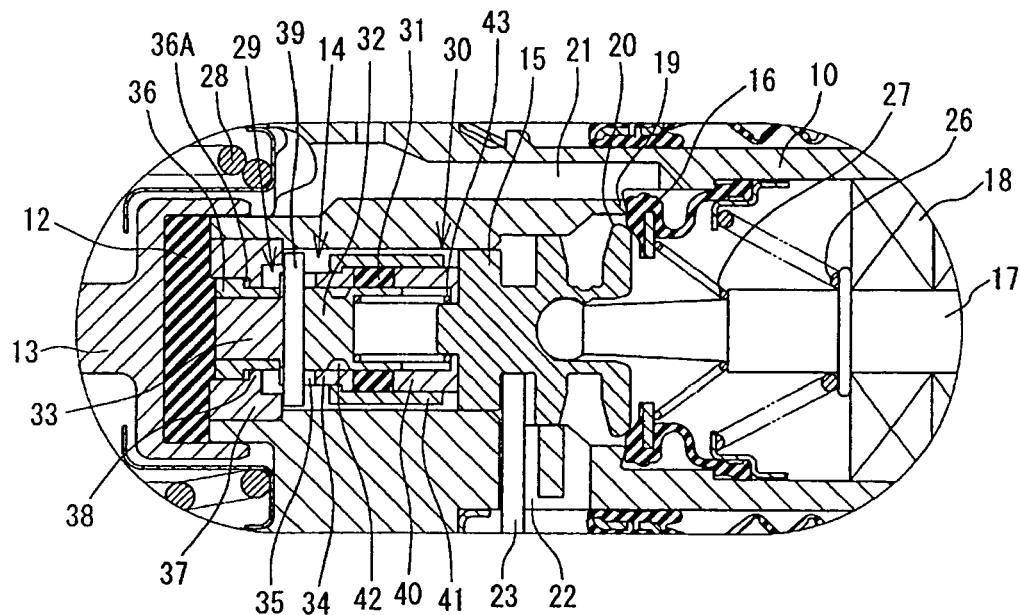
FIG. 4 is a view showing a normal braking condition of the device in FIG. 1.

When a normal braking operation is conducted such that the depression speed of the brake pedal is low, the plunger 15 is moved forward by the input rod 17 as shown in FIG. 4, whereby the seat portion 20 moves off the poppet seal 16. Then, atmospheric air is introduced into the variable pressure chambers 4B, 5B, and generates a pressure differential between the variable pressure chambers 4B, 5B and the constant pressure chambers 4A, 5A (negative pressure). The pressure differential generates a thrust force (servo power) in the power pistons 6, 7 which causes the valve body 10 to move forward, pushing the output rod 13 through the reaction disk 12. As the valve body 10 advances, the poppet seal 16 becomes in contact with the seat portion 20. As a result, atmospheric air is no longer introduced, and the pressure differential between the constant pressure chambers 4A, 5A and the variable pressure chambers 4B, 5B is maintained. At this time, a reaction force from the output rod 13 which acts on the reaction disk 12 is partly transmitted back to the plunger 15 and the input rod 17 via the brake assisting mechanism 14. Thus, a servo power corresponding to the brake pedal depression force can be generated.

In the brake assisting mechanism 14, an axial compression force is caused to act on the elastic member 31 by the reaction force from the reaction disk 12. The elastic member 31 is disposed in a closed space surrounded by the cylindrical portion 34, the cylindrical member 40, and the guide member 41, and hence, an amount of radially inward and outward deformation thereof is limited. Accordingly, an amount of axial compression (compression in the moving direction of the plunger 15) depends on the volume elasticity of the elastic member 31. Since the modulus of elasticity of the elastic member 31 is sufficiently high, substantially no compression occurs. Accordingly, the reaction force from the reaction disk 12 is transmitted through the elastic member 31 to the plunger 15 side as is.

Figure 7:
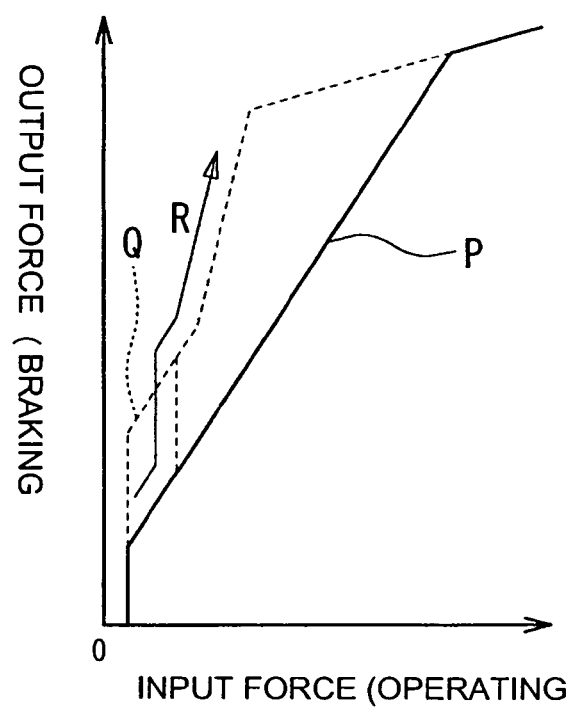
FIG. 7 is a graph showing a relationship between an input force and an output force of the device shown in FIG. 1.
Figure 8:
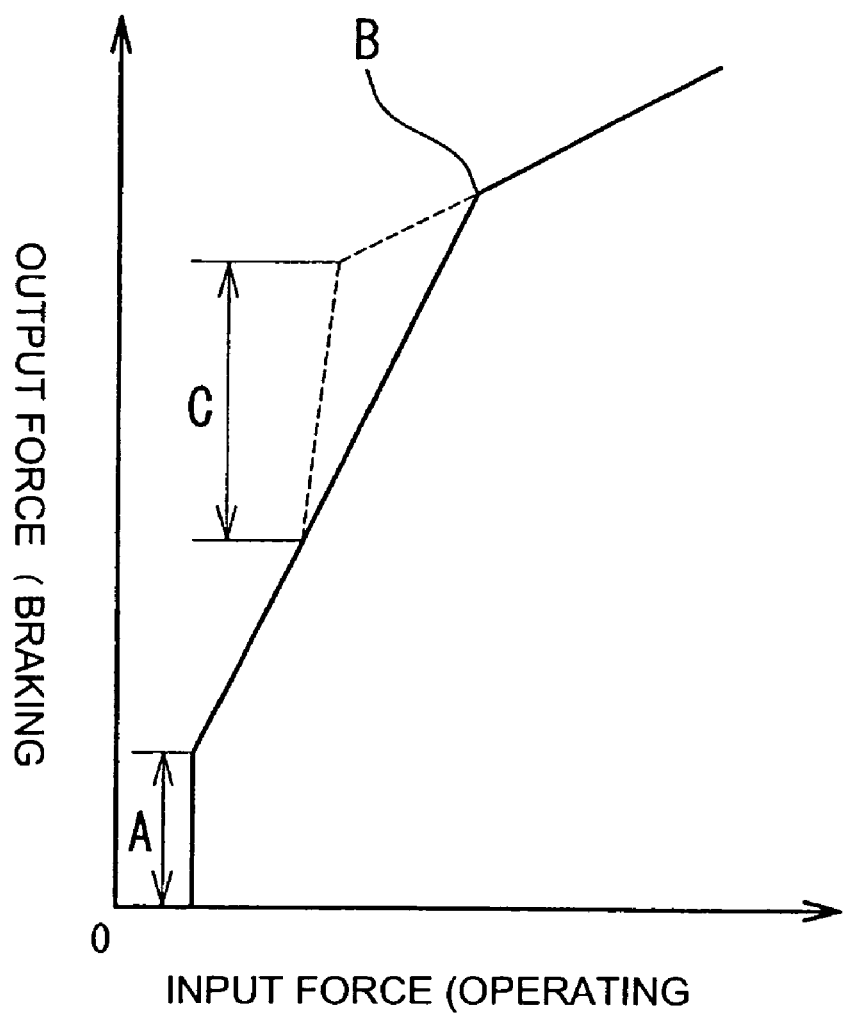
FIG. 8 is a graph showing a relationship between an input force and an output force in a conventional pneumatic booster comprising a brake assisting mechanism.

In the initial stage of the braking operation, since the jump-in clearance C exists, the plunger 15 can be moved forward without receiving a reaction force from the reaction disk 12, enabling a rapid development of braking force (a jump-in effect). Thereafter, the reaction force from the reaction disk 12 is transmitted back to the plunger 15 and the input rod 14 through the columnar portion 33 of the reaction force member 29 and the ratio ring 36 so as to generate a braking force corresponding to the brake pedal depression force. Hence, the relationship between the input force applied to the input rod 17 (the brake operating force) and the output force of the output rod 13 (the braking force), as indicated by a solid line P in FIG. 7, is established in such a manner that in the initial stage of a braking operation, a jump-in output force is generated, and thereafter, the output force increases in proportion to an increase in the input force to reach a full-load point.

When the input force applied to the input rod 17 is released, the return spring 26 causes the input rod 17 and plunger 15 to retract, whereby the seat portion 20 of the plunger 15 is pressed against the poppet seal 16 to separate the poppet seal 16 from the seat portion 19. As a result, the constant pressure chambers 4A, 5B become in communication with the variable pressure chambers 4B, 5B, thus eliminating the pressure differential therebetween, and the thrust force of the power pistons 6, 7 is lost. The return spring 28 then causes the valve body 10 to retract, thereby releasing the braking force.

Figure 5:
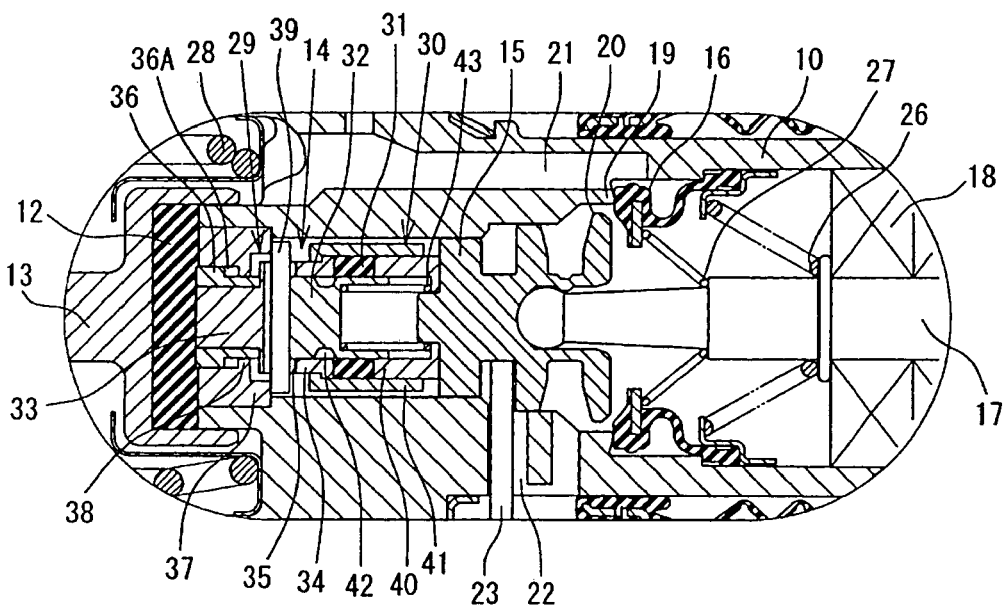
FIG. 5 is a view showing a condition in which a pin abuts against a rear end portion of a pressure receiving member during a rapid braking operation of the device in FIG. 1.
Figure 6:
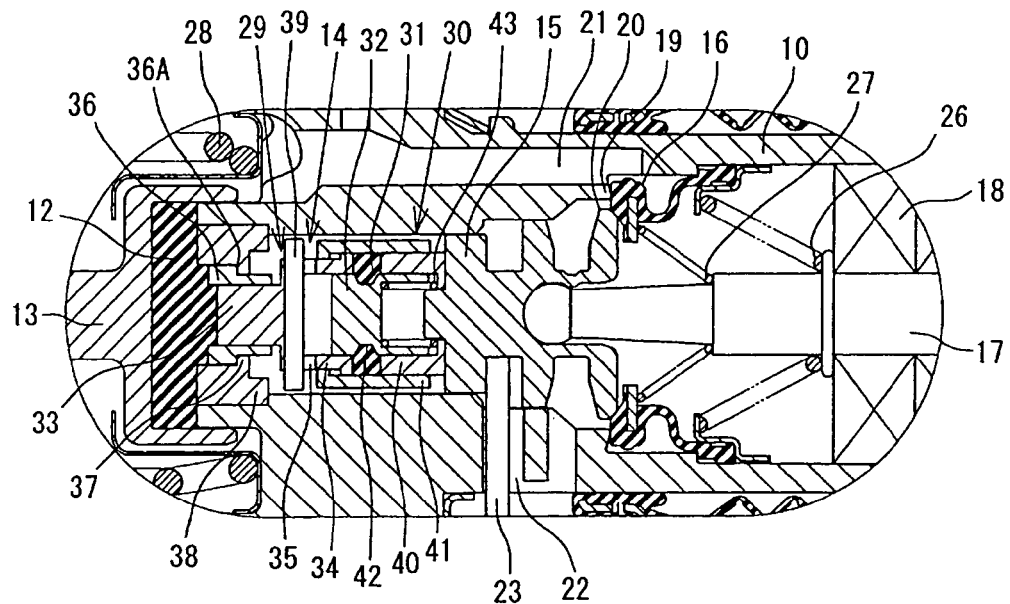
FIG. 6 is a view showing a condition in which a braking force is maintained after an elastic member is compressed during a rapid braking operation of the device in FIG. 1.

As shown in FIG. 5, during a full-braking emergency, or in other words when the brake pedal is fully depressed in an emergency situation, a delay occurs after the plunger 15 moves before a subsequent operation of the valve body 10 initiated by the thrust force of the power pistons 6, 7, causing the pin 39 to abut against the rear end portion of the pressure receiving member 37. As a result, the pin 39 pushes against the piston 32, causing the piston 32 to retract, whereby the outer peripheral groove 42 moves to a position contacting the elastic member 31. In this state, as shown in FIG. 6, radially inward deformation of the axially compressed elastic member 31 is permitted, and hence the elastic member 31 is pushed into the outer peripheral groove 42 of the piston 32. As a result, the modulus of elasticity in relation to axial compression becomes small enough to enable the brake assisting mechanism 14 to be axially compressed by the input force acting on the plunger 15 and the reaction force from the reaction disk 12. Therefore, the plunger 15 can be moved forward without increasing the reaction force from the reaction disk 12, and consequently the seat portion 20 can be separated from the poppet seal 16. Hence, atmospheric air can be introduced into the variable pressure chambers 4B, 5B to generate great servo power. Once the stepped portion 36A of the ratio ring 36 comes in contact with the stepped portion 38 of the pressure receiving member 37, the pressure receiving surface area decreases relative to the reaction force from the reaction disk 12, causing the boosting ratio to increase. By permitting axial compression of the elastic member 31 during an emergency operation of the brake assisting mechanism 14 in this manner, a braking force can develop rapidly while reducing the operating force, as shown by a broken line Q in FIG. 7. Note that when a full-braking is initiated during the normal braking (i.e., when the speed with which the brake pedal is depressed increases during braking), the braking operation becomes the full-braking operation described above from that instant. In so doing, a braking force can develop rapidly while reducing the operating force from a point in the braking operation, as shown by an arrow R in FIG. 7.

What is claimed is:

1. A pneumatic booster in which the interior of a housing is divided into a constant pressure chamber and a variable pressure chamber by a power piston, and a plunger disposed inside a valve body which is connected to the power piston is moved by an input rod, thereby opening valve means to introduce a working gas into the variable pressure chamber, thus generating a pressure differential between the constant pressure chamber and the variable pressure chamber, whereby a thrust force generated in the power piston by the pressure differential is applied to an output rod through a reaction member, and a reaction force from the output rod which acts on the reaction member is partly transmitted to the input rod, wherein an annular elastic member is interposed between the reaction member and the plunger, and control means are provided to restrict radially inward deformation of the elastic member, thereby restricting compression of the elastic member in the movement direction of the plunger, under normal conditions, and to permit radially inward deformation of the elastic member, thereby permitting compression of the elastic member in the movement direction of the plunger, when a movement amount of the plunger in relation to the valve body reaches a predetermined value.

2. The pneumatic booster according to claim 1, wherein a piston having an outer peripheral groove formed on an outer periphery thereof is slidably fitted into the annular elastic member, and the control means permit radially inward deformation of the elastic member, thereby permitting compression of the elastic member in the movement direction of the plunger, when the elastic member is pushed into the outer peripheral groove.

* * * * *